United States Patent [19]

Schuetz

[11] Patent Number: 4,830,994

[45] Date of Patent: * May 16, 1989

[54] GREENWARE BINDER

[75] Inventor: James E. Schuetz, Midland, Mich.

[73] Assignee: The Dow Chemical Company, Midland, Mich.

[*] Notice: The portion of the term of this patent subsequent to May 17, 2005 has been disclaimed.

[21] Appl. No.: 136,173

[22] Filed: Dec. 18, 1987

Related U.S. Application Data

[63] Continuation-in-part of Ser. No. 846,407, Mar. 31, 1986.

[51] Int. Cl.$^4$ ............................................. C04B 35/00
[52] U.S. Cl. ......................................... 501/127; 501/1; 501/87; 524/430; 524/612; 264/63; 419/65
[58] Field of Search ............... 524/430, 612; 501/127, 501/1, 87; 264/63; 419/65

[56] References Cited

U.S. PATENT DOCUMENTS

| | | | |
|---|---|---|---|
| 1,364,849 | 1/1921 | Anderson | 501/89 |
| 1,458,376 | 6/1923 | Anderson | 264/44 |
| 1,548,145 | 8/1925 | Keever | 51/308 |
| 1,548,146 | 8/1925 | Keever | 51/308 |
| 1,555,086 | 9/1925 | Tilton et al. | 51/308 |
| 1,918,242 | 7/1933 | Brenner et al. | 51/308 |
| 1,956,905 | 5/1934 | Merriam | 51/820 |
| 2,082,545 | 6/1937 | Ljungberg | 51/278 |
| 2,104,609 | 1/1938 | De Leeuw | 51/278 |
| 2,281,526 | 4/1942 | Milligan et al. | 51/308 |
| 2,290,366 | 7/1942 | Benner et al. | 106/39 |
| 2,293,099 | 8/1942 | Barnes et al. | 25/156 |
| 2,309,463 | 1/1943 | Lombard et al. | 51/293 |
| 2,312,392 | 3/1943 | Daniels | 51/298 |
| 2,361,784 | 10/1944 | Melton et al. | 51/293 |
| 2,423,293 | 7/1947 | Ciell | 51/293 |
| 2,534,128 | 12/1950 | Howe | 51/304 |
| 2,534,129 | 12/1950 | Howe | 51/305 |
| 4,634,720 | 1/1987 | Dorman et al. | 521/63 |
| 4,636,526 | 1/1987 | Dorman et al. | 521/61 |
| 4,661,536 | 4/1987 | Dorman et al. | 523/113 |
| 4,662,897 | 5/1987 | Atkinson et al. | 51/293 |

OTHER PUBLICATIONS

Don Tucker, "Abrasive and Bond Systems—and Their Uses," The 1986-87 AES Reference & Buyers' Guide, pp. 16-26.

Primary Examiner—William R. Dixon, Jr.
Assistant Examiner—Karl Group
Attorney, Agent, or Firm—P. D. Hayhurst; D. R. Howard

[57] ABSTRACT

Greenware having improved green strength is prepared using poly(ethyloxazoline) as a binder.

20 Claims, No Drawings

GREENWARE BINDER

CROSS-REFERENCE TO RELATED APPLICATION

This is a continuation-in-part of application Ser. No. 846,407 filed Mar. 31, 1986.

BACKGROUND OF THE INVENTION

This invention relates to ceramic greenware.

Conventional ceramic processing typically comprises ball milling a slurry, which contains a ceramic material and a solvent, to reduce the particle size of the ceramic material. The milled slurry is dried, such as by spray drying or pan drying, and the dried ceramic composition is then formed into greenware.

In the fabrication of ceramic articles, a temporary binder typically is employed. A good binder must satisfy several criteria. It should be soluble in the slurry containing the ceramic, and it should have a low solution viscosity thereby facilitating ball milling and permitting high solids content in the slurry. It should be compatible with other additives and processing steps. Since the binder is not a desirable component of a final ceramic article, it should be easily removable at some point in the processing sequence. In addition, the binder should impart green strength to the green fabricated article.

It would be desirable to have a binder having all of these properties. It would be especially desirable to have a binder which would impart improved strength to ceramic greenware as compared to greenware prepared using known binders.

SUMMARY OF INVENTION

This invention is the use of poly(ethyloxazoline) as such an improved binder for the preparation of greenware which can be fixed to produce ceramic articles.

Other aspects of the invention include: a method comprising forming a slurry containing a ceramic material and poly(ethyloxazoline), converting said slurry into a substantially dry powder, and converting the powder into greenware of a desired shape; the greenware, and the fired article prepared from the greenware.

Surprisingly, the use of poly(ethyloxazoline) as a greenware binder provides improved green strength at equal or lower binder levels. The use of lower binder levels advantageously increases productivity in that the binder "burns out" of the greenware more quickly and completely in the firing process, thus allowing shorter firing times. Higher green strength also leads to improved productivity via reducing the number of greenware articles damaged during normal handling procedures.

DETAILED DESCRIPTION OF THE INVENTION

The present invention employs a ceramic-containing material and a binder for the preparation of greenware. The ceramic-containing material preferably is a ceramic or a cermet.

Any ceramic which comprises an inorganic, nonmetallic material as its essential component can be employed in this invention. Preferred ceramics include, for example, oxides, carbides, nitrides, silicides, borides, phosphides, sulfides, and mixtures thereof. More preferred ceramics include magnesia, mullite, thoria, beryllia, urania, spinels, zirconium oxide, bismuth oxide, aluminum oxide, magnesium oxide, silica, barium titanate, cordierite, boron nitride, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, hafnium nitride, niobium nitride, boron nitride, silicon nitride, titanium boride, chromium boride, zirconium boride, tantalum boride, molybdenum boride, tungsten boride, cerium sulfide, titanium sulfide, magnesium sulfide, zirconium sulfide and mixtures and alloys of these. For example, ceramics comprising superconducting mixed oxides of metals such as Ba, La, Cu and Y can be employed in the present invention. Even more preferred ceramics include zirconium oxide, aluminum oxide, magnesium oxide, barium titanate, silicon carbide, cordierite, spinels and boron nitride. The most preferred ceramic is aluminum oxide. Preferably, the ceramic-containing material consists essentially of a ceramic and, more preferably, the ceramic-containing material consists of a ceramic.

An optional component of the composition of this invention is a metallic material selected from the group consisting of cobalt, nickel, iron, tungsten, molybdenum, tantalum, titanium, chromium, niobium, boron, zirconium, vanadium, silicon, palladium, hafnium, aluminum, copper and alloys and mixtures of these. By definition, a ceramic/metal intermixed composition is a cermet. Examples of cermets include mixtures of the ceramics and metals listed hereinabove. Tungsten carbide/cobalt is an example of a preferred cermet.

In a preferred embodiment of this invention, the ceramic-containing material is particulate and has a particle size of about 100 microns or less, more preferably about 10 microns or less, and most preferably about 1 micron or less. In another preferred embodiment, fibrous ceramic-containing material or other reinforcing material can be mixed with the particulate ceramic-containing material. It is believed that incorporation of fibrous ceramic material or other reinforcing material may increase the strength and fracture toughness of the ceramic body produced.

The binder, poly(ethyloxazoline), is employed in a binding amount. Preferably, the binder is employed in an amount sufficient to provide the greenware with enough strength to retain its shape during normal handling and processing. Preferably the ceramic-containing composition comprises between about 0.1 and about 20 weight percent poly(ethyloxazoline) and more preferably between about 0.1 and about 10 weight percent based on the weight of the ceramic-containing material. Even more preferably, said composition comprises between about 0.2 and about 5 weight percent of poly(ethyloxazoline), and most preferably from about 0.5 to about 3.0 weight percent. Poly(ethyloxazoline) is a commercially available polymer. It is well known to those familiar with this polymer that poly(ethyloxazoline) is hydrolyzed only under severe conditions, e.g. at high temperatures in the presence of very strong acids or bases. According to the present invention the poly(ethyloxazoline) preferably is employed as such and as defined, i.e. unhydrolyzed. However, in the process of the present invention it is possible to employ poly(ethyloxazoline) which has been partially hydrolyzed via methods known in the art. The poly(ethyloxazoline) preferably has a weight average molecular weight ranging from about 10,000 to about 1,000,000 and more preferably from 100,000 to about 600,000.

A preferred embodiment of this invention is a composition or article consisting essentially of a ceramic-containing material and poly(ethyloxazoline), and a more preferred embodiment is a ceramic-containing composition or article consisting of a ceramic-containing material and poly(ethyloxazoline).

The greenware of the present invention is self-supporting and has good green strength. Surprisingly, it is possible to prepare greenware having a given level of green strength using lower levels of poly(ethyloxazoline) than compared to other binders. In view of this, it is clear that other binders are not required, but can be employed if desired. Preferably, the greenware of the present invention is substantially free of polyolefins or synthetic biodegradable polymers, such as polymers of alpha-amino acids, e.g. polymers of alpha-amino acid N-carboxyanhydrides, whether polymerized in situ or otherwise. For the purposes of the present invention, the term "substantially free" means that the material of which the greenware is "substantially free" is not added to the greenware in an amount which is greater than 10 weight percent of the ceramic or cermet of the greenware article or composition in question. For the purposes of the present invention, the term "essentially free" means that the material of which the greenware is "essentially free" is not added to the greenware in an amount which is greater than 5 weight percent of the ceramic or cermet of the greenware article or composition in question.

The method of this invention comprises forming a slurry of the ceramic material and poly(ethyloxazoline). The slurry preferably contains a solvent which substantially solubilizes poly(ethyloxazoline). Preferred solvents include water, methanol, ethanol, acetone, other polar organic solvents, and mixtures thereof. Water is the most preferred solvent due to its ease of use and nonflammability. However, polar organic solvents, such as methanol, ethanol and acetone, are particularly useful in this invention if it is desired to avoid the chemical reactions that may occur if the ceramic is in the presence of water. For example, nitrides may form oxides in the presence of water, and this may or may not be desired.

The slurry preferably contains a solids content of between about 20 to about 80 weight percent and more preferably between about 50 and about 70 percent. In a preferred embodiment of this invention, the slurry, comprising the ceramic-containing material and poly(ethyloxazoline), is ball milled by conventional and well-known techniques. The ball milling reduces the particle size of the ceramic-containing material and distributes the poly(ethyloxazoline) substantially uniformly over the particles. Poly(ethyloxazoline) may facilitate said milling due to its low solution viscosity, thereby permitting a high solid to liquid ratio. In addition, a dispersant, such as DARVAN®, an ammonium polyelectrolyte commercially available from R. T. Vanderbilt Company, Inc., can be added to the above slurry in an amount sufficient to facilitate milling and aid in maintaining a high solid to liquid ratio. Mixtures of dispersants can be employed. If a dispersant is employed, it is preferably employed in an amount which is less than about one weight percent, and more preferably is from about 0.1 to about 1 weight percent, of the amount of the ceramic-containing material. A high solid to liquid ratio in the slurry is desirable for several well-known reasons. Excessive solvent may produce lower density particles and higher losses of fine particles. Therefore, excess solvent preferably is removed prior to further processing. The slurry can contain other optional components. For example, a plasticizer can be employed in an amount sufficient to lower the glass transition temperature of the binder so that the binder can flow at low applied pressure at low temperatures. If a plasticizer is employed, it is preferably employed in an amount which is from about 5 to about 50 weight percent, and more preferably from about 15 to about 25 percent, of the amount of binder. Examples of plasticizers include polyethylene glycol, propylene glycol, dipropylene glycol, tripropylene glycol, glycerine, and the like, and mixtures thereof. As is well-known to those skilled in the art, the ball milling of the slurry produces an intermixture of the poly(ethyloxazoline) and the ceramic-containing material. Thus, the greenware produced from ball milled material comprises an intermixture of poly(ethyloxazoline) and the ceramic-containing material.

The slurry can be converted into a substantially dry powder by methods known to those skilled in the art. Any method which produces a substantially dry powder from the ceramic slurry can be utilized in this invention. Preferably, said conversion is accomplished by spray drying or pan drying, with or without the application of heat. Preferably, the slurry is filtered to obtain the smallest particles prior to drying. In one preferred embodiment, the slurry is converted into a dry powder in a nitrogen atmosphere in order to prevent oxidation of the ceramic-containing material which can occur in an oxygen-containing atmosphere.

A preformed ceramic-containing article, i.e. a preform or greenware, comprising the ceramic material and poly(ethyloxazoline) can be fabricated by any suitable means such as, for example, dry pressing, isostatic pressing, extrustion or slip casting. The greenware preferably will have the desired shape of the final product and have sufficient density to substantially retain its shape during handling and further processing. The greenware possesses greater green compressive strength than ceramic preforms prepared using equal levels of binders currently known in the art.

The greenware can be heated to remove or burn out the poly(ethyloxazoline). It is desirable to burn out the poly(ethyloxazoline), preferably over a temperature range of between about 380° C. and about 450° C. Details as to useful burn out time, temperature, and pressure are easily ascertained by workers skilled in the art. The ceramic preform can be further densified using known methods following binder removal to produce the final ceramic product. Examples of densification methods include hot pressing, hot isostatic pressing, sintering, hot isostatic forging and the like.

SPECIFIC EMBODIMENTS

The following examples and comparative experiments are included for illustrative purpose only, and are not intended to limit the scope of the invention or claims. All parts and percentages are by weight unless otherwise specified.

EXAMPLE 1

A slurry containing poly(ethyloxazoline) (25 g) having a weight average molecular weight of approximately 200,000 (available from The Dow Chemical Company), deionized water (302 g), DARVAN® (1.5 g) and aluminum oxide (1,000 g) is mixed for 5 minutes. Then, the slurry is ball milled in a 1-gallon ball mill containing aluminum oxide balls (1-inch diameter) for 20 hours and then is screened through a 100-mesh screen to remove any oversized materials and the balls. The slurry is then air dried for 12 hours at ambient temperature. A portion of the powder is then pressed into pellets under 16,000 psi. The green compressive strength of the pellets is measured using an Instron tester. The results are summarized in Table 1.

COMPARATIVE EXPERIMENT 1

(not an embodiment of the invention)

A comparative sample pellet is prepared by substantially following the procedure of Example 1 except that polyvinyl alcohol (GELVETOL ® 20/30) available from Monsanto Company, is used as the binder instead of poly(ethyloxazoline). The data obtained is summarized in Table 1.

TABLE 1

| Binder | Percent[4] | Percent[5] Solids | Viscosity[1] (cps) | Percent Water[2] After Drying | Green[3] Density (g/cc) | Green[3] Compressive Strength (psi) ASTM D-695 |
|---|---|---|---|---|---|---|
| Poly(ethyloxazoline) | 2.5 | 70.0 | 2120 | 0.44 | 2.310 | 1320 |
| Polyvinyl alcohol | 2.5 | 70.0 | 1520 | 0.39 | 2.292 | 810 |

[1]Brookfield, #5 spindle, 50 rpm.
[2]Gravimetric, percent weight loss after heating 1.5 hours at 127° C.
[3]Triplicate samples.
[4]Percent of the ceramic/binder composition which is binder.
[5]Percent of the slurry which is solids.

EXAMPLE 2

Aqueous slurries having 70.0 weight percent solids, and 3.0 weight percent poly(ethyloxazoline), with varying concentrations of propylene glycol as a plasticizer, are prepared. The composition of the slurry is as follows:

| Ingredient | Grams |
|---|---|
| Water | 36.2 |
| Propylene glycol | vary |
| Poly(ethyloxazoline) | 28.0 |
| DARVAN ® | 0.1 |
| Al₂O₃(Alcoa A-16,SG) | 135.8 |

The first four ingredients are mixed for five minutes. The last ingredient is then added and mixed is then continued for 25 minutes. The slurry is spread thinly onto a film and is dried in air for 16–24 hours at ambient temperature. The dried powder is ground and is passed through a 40 mesh screen. The screened powder is pressed into pellets at 16,000 psi. The green compressive strength of the pellets is measured using an Instron tester. The green densities of the pellets are summarized in Table 2. The green compressive strength results are given in Table 3. In Tables 2 and 3 the weight average molecular weights of the poly(ethyloxazoline) are 50,000; 200,000 and 400,000 respectively.

COMPARATIVE EXPERIMENT 2

(not an embodiment of the invention)

The procedure of Example 2 is repeated except that the poly(ethyloxazoline) is replaced with other materials. The data obtained is summarized in Tables 2 and 3.

TABLE 2

| | Green Density (g/cc) Percent propylene Glycol | | | | |
|---|---|---|---|---|---|
| Binder | 0 | 2.5 | 5.0 | 7.5 | 10.0 |
| Poly(ethyloxazoline)-50 | 2.331 | 2.255 | 2.295 | 2.286 | 2.270 |
| Poly(ethyloxazoline)-200 | 2.280 | 2.288 | 2.284 | 2.302 | 2.299 |
| Poly(ethyloxazoline)-400 | 2.290 | 2.332 | 2.308 | 2.305 | 2.310 |
| Methocel ® E-3P[1] | 2.242 | 2.290 | 2.294 | 2.300 | 2.286 |
| Polyvinyl alcohol[2] | 2.232 | 2.281 | 2.777 | 2.292 | 2.298 |

[1]Trademark of The Dow Chemical Company for cellulose ethers, not an example of this invention.
[2]Vinol 205 ®, trademark of Air Products and Chemicals, not an example of this invention.

TABLE 3

| | Green Compressive Strength (psi)[3] Percent propylene Glycol | | | | |
|---|---|---|---|---|---|
| Binder | 0 | 2.5 | 5.0 | 7.5 | 10.0 |
| Poly(ethyloxazoline)-50 | 785 | 955 | 800 | 970 | 685 |
| Poly(ethyloxazoline)-200 | 1010 | 2210 | 2138 | 1938 | 1560 |
| Poly(ethyloxazoline)-400 | 1375 | 2270 | 1975 | 1850 | 1585 |
| Methocel ® E-3P[1] | 740 | 825 | 1015 | 1035 | 990 |
| Polyvinyl alcohol[2] | 1305 | 1450 | 1285 | 1300 | 1113 |

[1]Trademark of The Dow Chemical Company for cellulose ethers, not an example of this invention.
[2]Vinol 205 ®, trademark of Air Products and Chemicals, Inc., not an example
[3]ASTM D-695

EXAMPLE 3

A 25 percent solution of poly(ethyloxazoline) in methanol is prepared by adding 25 grams of poly(ethyloxazoline) to 75 grams of methanol in a screw-capped bottle and placing the bottle on a shaker for 6 hours. Then, 30 grams of the poly(ethyloxazoline) solution is placed in a vessel equipped with an air stirrer having a high-shear blade. To the solution is added 292.5 grams of tungsten carbide/cobalt powder (94% WC/6% Co). The mixture is mixed for 10 minutes and the resulting formulation is spread thinly onto Mylar film, air dried overnight, ground in a Waring blender, screened through a 100 mesh screen, and then pressed into pellets with 16,000 psi pressing pressure. The green density and green compressive strength results are summarized in Table 4.

COMPARATIVE EXPERIMENT 3

(not an embodiment of the invention)

The procedure of Example 2 is repeated except that the poly(ethyloxazoline) is replaced with paraffin wax. The data obtained is summarized in Table 4.

TABLE 4

| Binder | % Binder | % WC/Co[2] | Green Density (g/cc) | Green Compressive Strength (psi) |
|---|---|---|---|---|
| Poly(ethyloxazoline)-200 | 2.5 | 97.5 | 7.701 | 10,800 |

TABLE 4-continued

| Binder | % Binder | % WC/Co[2] | Green Density (g/cc) | Green Compressive Strength (psi) |
|---|---|---|---|---|
| Parafin Wax[1] (ESAR-145) | 3.0 | 97.0 | 8.286 | 1,510 |

[1] Not an example of this invention.
[2] Tungsten carbide with 6% cobalt.

EXAMPLE 4

The procedure of Example 1 is repeated, except as noted for Sample B, using the following ingredients:

| Sample | Ingredient | Wt. % |
|---|---|---|
| A[1] | Alumina ($Al_2O_3$) (A-16SG) | 93.57 |
|  | Boron Carbide | 3.90 |
|  | Citric acid | 0.10 |
|  | Carbowax ®[2] 3350 | 2.43 |
|  | Water to give 75% solids |  |
| B | Alumina ($Al_2O_3$) (A-16SG) | 93.57 |
|  | Boron Carbide | 3.90 |
|  | Citric acid | 0.10 |
|  | Poly(ethyloxazoline) (as 20% aqueous solution) | 2.43 |
|  | Water to give 70% solids |  |

[1] Not an example of this invention.
[2] Trademark of Union Carbide Corporation for polyethylene glycol.

For Sample B the last three ingredients are mixed and then added to the first two ingredients. Pellets were prepared for both samples according to Example 1.

The green density and green compressive strength results for both samples are given in Table 5.

TABLE 5

| Binder | % Binder | % $Al_2O_3$ | % $B_4C$ | % Citric Acid | Green Density (g/cc) | Green Compressive Strength (psi) |
|---|---|---|---|---|---|---|
| Poly(ethyloxazoline)-200 | 2.4 | 93.6 | 3.9 | 0.1 | 2.251 | 2350 |
| Carbowax ® 3350[1] | 2.4 | 93.6 | 3.9 | 0.1 | 2.429 | 340 |

[1] Not an example of this invention.

What is claimed is:

1. A greenware article consisting essentially of a ceramic-containing material and poly(ethyloxazoline) as a binder, the binder being employed in an amount sufficient to provide the greenware with enough strength to retain its shape during normal handling and processing.

2. The article of claim 1 wherein the ceramic-containing material is selected from the group consisting of oxides, carbides, nitrides, silicides, borides, sulfides, phosphides and mixtures thereof.

3. The article of claim 1 wherein the ceramic-containing material consists essentially of a ceramic.

4. The article of claim 1 further consisting essentially of a metallic material selected from the group consisting of cobalt, nickel, iron, tungsten, molybdenum, tantalum, titanium, chromium, niobium, boron, zirconium, vanadium, silicon, palladium, hafnium, aluminum, copper, alloys thereof or mixtures thereof.

5. The article of claim 1 having between about 0.1 and about 20 weight percent of poly(ethyloxazoline).

6. The article of claim 1 having between about 0.1 and about 10 weight percent of poly(ethyloxazoline).

7. The article of claim 1 having between about 0.1 and about 5 weight percent of poly(ethyloxazoline).

8. The article of claim 1 wherein the poly(ethyloxazoline) has a molecular weight in a range from about 10,000 to about 1,000,000.

9. The article of claim 1 wherein the poly(ethyloxazoline) has a molecular weight in a range from about 100,000 to about 600,000.

10. The article of claim 1 wherein the ceramic-containing material is aluminum oxide.

11. The article of claim 1 wherein the ceramic-containing material is boron carbide.

12. The article of claim 1 wherein the ceramic-containing material is silica.

13. The article of claim 1 wherein the ceramic-containing material is tungsten carbide.

14. The article of claim 13 further consisting essentially of up to about 10 weight percent cobalt.

15. An intermixture consisting essentially of: (a) at least one ceramic or cermet; (b) from about 0.1 to about 20 weight percent of poly(ethyloxazoline) based on the weight of component (a); (c) a solvent; and optionally (d) a plasticizer; and optionally (e) a dispersant.

16. An intermixture consisting essentially of a ceramic-containing material and from about 0.1 to about 20 weight percent of unhydrolyzed poly(ethyloxazoline).

17. The composition of claim 16 which is substantially free of synthetic biodegradable polymers.

18. The intermixture of claim 16 wherein the ceramic-containing material is selected from the group consisting of alumina, silica, boron carbide, zirconia, silicon carbide, tungsten carbide, magnesium oxide, barium titanate, spinel or boron nitride.

19. The intermixture of claim 16 wherein the ceramic is a carbide, the intermixture further consisting essentially of a metal.

20. The intermixture of claim 16 having between about 0.1 and about 5 weight percent of poly(ethyloxazoline).

* * * * *

UNITED STATES PATENT AND TRADEMARK OFFICE
CERTIFICATE OF CORRECTION

PATENT NO. : 4,830,994

DATED : May 16, 1989

INVENTOR(S) : James E. Schuetz

It is certified that error appears in the above-identified patent and that said Letters Patent is hereby corrected as shown below:

Column 3, line 47 please delete "to" and insert -- and --.

Column 5, line 47 please delete "mixed" and insert -- mixing --.

Column 8, line 49 please delete "composition" and insert -- intermixture --.

Column 8, lines 49-50 please delete "which is substantially free of" and insert -- further consisting essentially of less than about ten percent by weight of --.

Signed and Sealed this

Eighth Day of May, 1990

Attest:

HARRY F. MANBECK, JR.

*Attesting Officer*     *Commissioner of Patents and Trademarks*